(12) United States Patent
Fukushima et al.

(10) Patent No.: US 7,652,665 B2
(45) Date of Patent: Jan. 26, 2010

(54) METHOD FOR PRODUCING MULTI-VIEWPOINT IMAGE FOR THREE-DIMENSIONAL IMAGE DISPLAY AND PROGRAM THEREFOR

(75) Inventors: Rieko Fukushima, Tokyo (JP); Tatsuo Saishu, Tokyo (JP); Hitoshi Kobayashi, Kawasaki (JP); Yuzo Hirayama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/581,363

(22) PCT Filed: Apr. 13, 2006

(86) PCT No.: PCT/JP2006/308251
§ 371 (c)(1),
(2), (4) Date: Dec. 5, 2008

(87) PCT Pub. No.: WO2006/112488
PCT Pub. Date: Oct. 26, 2006

(65) Prior Publication Data
US 2009/0079762 A1    Mar. 26, 2009

(30) Foreign Application Priority Data
Apr. 14, 2005    (JP) .............................. 2005-117341

(51) Int. Cl.
*G06T 15/00*    (2006.01)
(52) U.S. Cl. ........................ 345/419; 345/427; 345/620; 345/621; 348/42; 348/43; 348/148; 359/462; 352/57
(58) Field of Classification Search .................. 345/419, 345/621, 427, 620; 359/462; 352/57
See application file for complete search history.

(56) References Cited

U.S. PATENT DOCUMENTS

| | | | |
|---|---|---|---|
| 5,727,242 A | 3/1998 | Lo et al. | |
| 2004/0135886 A1 | 7/2004 | Baker et al. | |
| 2005/0264651 A1 | 12/2005 | Saishu et al. | |
| 2007/0122027 A1* | 5/2007 | Kunita et al. | 382/154 |

FOREIGN PATENT DOCUMENTS

| | | |
|---|---|---|
| JP | 10-56654 | 2/1998 |
| JP | 2003-43413 | 2/2003 |
| JP | 2003-107603 | 4/2003 |
| JP | 2004-178579 | 6/2004 |
| JP | 2004-198971 | 7/2004 |

OTHER PUBLICATIONS

Notification of Reasons for Rejection issued by the Japanese Patent Office on Mar. 3, 2009, for Japanese Patent Application No. 2005-117341, and English-language translation thereof.

(Continued)

*Primary Examiner*—Kimbinh T Nguyen
(74) *Attorney, Agent, or Firm*—Finnegan, Henderson, Farabow, Garrett & Dunner, L.L.P.

(57) ABSTRACT

A method for producing a multi-viewpoint image for a three-dimensional image display, includes: providing a plurality of viewpoints to be spaced at equal intervals in direction perpendicular to a single reference projection plane including target viewpoints serving as reference are spaced at constant intervals in a first direction parallel to the reference projection plane; providing a plurality of individual target viewpoints which are respectively different from the target viewpoints serving as reference and serve as feet of a perpendicular to the plurality of viewpoints, corresponding to the respective viewpoint, on a projection plane which is a plane including the reference projection plane; making determination such that the shapes and the sizes of the individual projection planes are included in the reference projection plane in overlapping regions of the individual projection planes acquired from two viewpoints positioned at the outermost positions of the plurality of viewpoints; and clipping only regions of the reference projection plane from the individual projection planes acquired from the respective viewpoints to form a multi-viewpoint image for three-dimensional image display.

17 Claims, 15 Drawing Sheets

OTHER PUBLICATIONS

Isono et al., "Autostereoscopic 3-D Television Using Eight TV Cameras," The Journal of the Institute of Television Engineers of Japan (Oct. 20, 1994), 48:1267-75, Abstract.

International Preliminary Report on Patentability and Written Opinion issued by the International Bureau of WIPO on Oct. 16, 2007, for International Application No. PCT/JP2006/308251.

Hoshino et al., "Analysis of resolution limitation of integral photography," J. Opt. Soc. Am. A (Aug. 1998), 15:2059-65.

Okoshi, "Three-Dimensional Imaging Techniques," Academic Press (1976), pp. 62-73.

International Search Report issued by the European Patent Office on Aug. 21, 2006, for International Application No. PCT/JP2006/308251.

Written Opinion issued by the European Patent Office for International Application No. PCT/JP2006/308251.

First Office Action issued by the Chinese Patent Office on Sep. 4, 2009, for Chinese Patent Application No. 2006800116247, and English-language translation thereof.

* cited by examiner

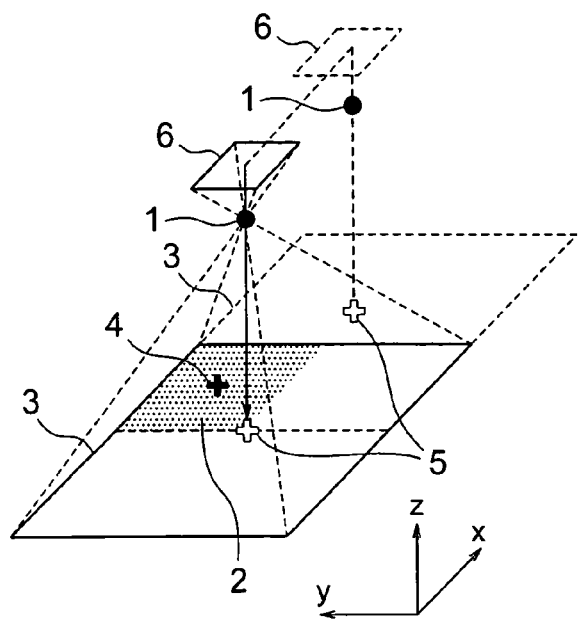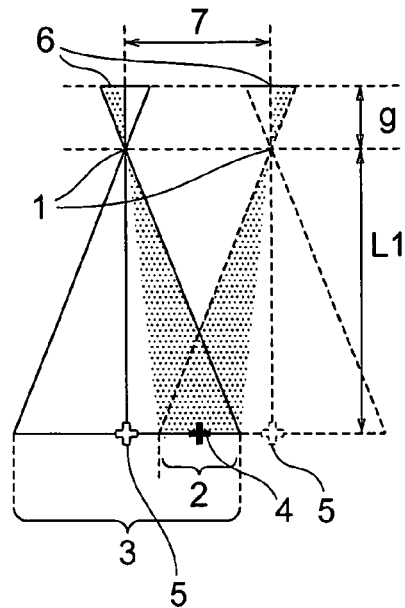
FIG. 1A
FIG. 1B
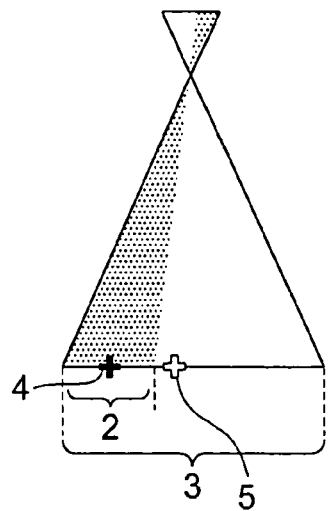
FIG. 1C

| | [mm] | | [pixel] | | [mm/pixel] | REMARKS |
|---|---|---|---|---|---|---|
| 2D DISPLAY PARAMETERS | | | | | | |
| D_W_h | WIDTH | D_x_h | HORIZONTAL NUMBER OF PIXELS | D_p_h | HORIZONTAL PIXEL PITCH | |
| D_W_v | HEIGHT | D_x_v | VERTICAL NUMBER OF PIXELS | D_p_v | VERTICAL PIXEL PITCH | |
| 3D DISPLAY PARAMETERS | | | | | | |
| 3D_W_h | WIDTH | 3D_x_h | HORIZONTAL NUMBER OF PIXELS | 3D_p_h | HORIZONTAL PIXEL PITCH | |
| 3D_W_v | HEIGHT | 3D_x_v | VERTICAL NUMBER OF PIXELS | 3D_p_v | VERTICAL PIXEL PITCH | |
| REFERENCE PROJECTION PLANE PARAMETERS | | | | | | |
| P_W_h | WIDTH | P_x_h | HORIZONTAL NUMBER OF PIXELS | P_p_h | HORIZONTAL PIXEL PITCH | REFERENCE PROJECTION PLANE |
| P_W_v | HEIGHT | P_x_v | VERTICAL NUMBER OF PIXELS | P_p_v | VERTICAL PIXEL PITCH | REFERENCE PROJECTION PLANE |
| INDIVIDUAL PROJECTION PLANE PARAMETERS | | | | | | |
| P_ray | HORIZONTAL INTERVAL | | | | | LIGHT RAY INTERVAL AT L1 |
| S_W_h | WIDTH | S_x_h | HORIZONTAL NUMBER OF PIXELS | Sp_p_h | HORIZONTAL PIXEL PITCH | SHOT IMAGE HORIZONTAL |
| S_W_v | HEIGHT | S_x_v | VERTICAL NUMBER OF PIXELS | S_p_v | VERTICAL PIXEL PITCH | SHOT IMAGE VERTICAL |
| Shift_W | | Shift_x | | Shift_p | | SHIFT IN HORIZONTAL COORDINATE BETWEEN INDIVIDUAL PROJECTION PLANES |
| Shift_all_W | | Shift_all_x | | Shift_all_p | | SHIFT OF INDIVIDUAL PROJECTION PLANE AT OUTERMOST END |
| Overlap_W | | Overlap_x | | Overlap_p | | OVERLAPPING HORIZONTAL WIDTH BETWEEN INDIVIDUAL PROJECTION PLANES |

FIG. 4

| ENLARGEMENT AND REDUCTION OF MULTI-VIEWPOINT IMAGE | | |
|---|---|---|
| Zoom_S | zoom_N | ZOOM (MAGNIFICATION) |

FIG. 5

|  | [mm] |  | [pixel] |  | [mm/pixel] |
|---|---|---|---|---|---|
| 2D DISPLAY PARAMETERS | | | | | |
| D_W_h | =D_p_h*D_x_h | D_x_h | =DEFAULT | D_p_h | =DEFAULT |
| D_W_v | =D_p_v*D_x_v | D_x_v | =DEFAULT | D_p_v | =DEFAULT |
| 3D DISPLAY PARAMETERS | | | | | |
| 3D_W_h | =D_W_h | 3D_x_h | =D_x_h*3/Np | 3D_p_h | =3D_W_h/3D_x_h |
| 3D_W_v | =D_W_v | 3D_x_v | =DEFAULT | 3D_p_v | =3D_W_v/3D_x_v |
| ENLARGEMENT AND REDUCTION OF MULTI-VIEWPOINT IMAGE | | | | | |
| zoom_S | =DEFAULT | zoom_N | =DEFAULT | | |
| REFERENCE PROJECTION PLANE PARAMETERS | | | | | |
| P_W_h | =D_W_h*zoom_S | P_x_h | =3D_x_h*zoom_N | P_p_h | =P_W_h/P_x_h |
| P_W_v | =D_W_v*zoom_S | P_x_v | =3D_x_v*zoom_N | P_p_v | =P_W_v/P_x_v |
| INDIVIDUAL PROJECTION PLANE PARAMETERS | | | | | |
| P_ray | =(D_p_h/3)*L1/g | | | | |
| S_W_h | =Sp_p_h*S_x_h | S_x_h | =Shift_all_x+ Overlap_x | Sp_p_h | =P_p_v |
| S_W_v | =S_p_v*S_x_v | S_x_v | =ROUND(2*(L1/ TAN($\phi$)+P_W_v/2) /P_p_v) | S_p_v | =P_p_v |
| Shift_W | =Shift_p*Shift_x | Shift_x | =ROUND(P_ray_/ P_p_v) | Shift_p | =P_p_v |
| Shift_all _W | =Shift_all_p*Shift _all_x | Shift_all _x | =Shift_x*(N_need −1) | Shift_all _p | =P_p_v |
| Overlap_ W | =Overlap_p* Overlap_x | Overlap_ x | =P_x_h*P_p_h/ P_p_v | Overlap_p | =P_p_v |

FIG. 6

| φ [degree] | 45 | 50 | 55 | 60 | 65 |
|---|---|---|---|---|---|
| b/a | 1 | 0.84 | 0.70 | 0.58 | 0.47 |

FIG. 8

| | [mm] | | [pixel] | | [mm/pixel] | REMARKS |
|---|---|---|---|---|---|---|
| CAMERA PARAMETERS | | | | | | |
| F_W_h | WIDTH | F_x_h | HORIZONTAL NUMBER OF PIXELS | F_p_h | HORIZONTAL PIXEL PITCH | FILM HORIZONTAL |
| F_W_v | HEIGHT | F_x_v | VERTICAL NUMBER OF PIXELS | F_p_v | VERTICAL PIXEL PITCH | FILM VERTICAL |
| F | FOCAL LENGTH | | | | | DISTANCE BETWEEN FILM AND LENS |

FIG. 10

| | [mm] | | [pixel] | | [mm/pixel] |
|---|---|---|---|---|---|
| ENLARGEMENT AND REDUCTION OF MULTI-VIEWPOINT IMAGE | | | | | |
| zoom_S | =DEFAULT | zoom_N | =P_x_v/3D_x_v | | |
| REFERENCE PROJECTION PLANE PARAMETERS | | | | | |
| P_W_h | =P_p_h*P_x_h | P_x_h | =ROUND(P_x_v* 3D_W_h/3D_W_v) | P_p_h | =F_p_h*L1/f |
| P_W_v | =3D_W_h*Zoom_S | P_x_v | =ROUND(P_W_v/ P_p_v) | P_p_v | =F_p_v*L1/f |
| INDIVIDUAL PROJECTION PLANE PARAMETERS | | | | | |
| P_ray | =(FD_p_h/3)*L 2/g | | | | |
| S_W_h | =Sp_p_h*S_x_h | S_x_h | =F_x_h | Sp_p_h | =P_p_v |
| S_W_v | =Fp_p_h*F_x_h | S_x_v | =F_x_v | S_p_v | =P_p_v |
| Shift_W | =Shift_p * Shift_x | Shift_x | =ROUND(P_W_h/ P_p_v) | Shift_p | =P_p_v |
| Shift_all _W | =Shift_all_p * Shift_all_x | Shift_all_x | =Shift_x * (N_all _result−1) | Shift_all_p | =P_p_v |
| Overlap_ W | =Overlap_p * Overlap_x | Overlap_ x | =S_x_h−Shift_all _x | Overlap_p | =P_p_v |
| CAMERA PARAMETERS | | | | | |
| F_W_h | =F_W_v*F_x_h/ F_x_v | F_x_h | =DEFAULT | F_p_h | =F_W_h/F_x_h |
| F_W_v | =DEFAULT | F_x_v | =DEFAULT | F_p_v | =F_W_v/F_x_v |
| F | =DEFAULT | | | | |

FIG. 11

|  | [mm] |  | [pixel] |  | [mm/pixel] |
|---|---|---|---|---|---|
| 2D DISPLAY PARAMETERS | | | | | |
| D_W_h | 331.2 | D_x_h | 1920 | D_p_h | 0.1725 |
| D_W_v | 207 | D_x_v | 1200 | D_p_v | 0.1725 |
| 3D DISPLAY PARAMETERS | | | | | |
| 3D_W_h | 331.2 | 3D_x_h | 320 | 3D_p_h | 1.035 |
| 3D_W_v | 207 | 3D_x_v | 400 | 3D_p_v | 0.5175 |
| ENLARGEMENT AND REDUCTION OF INDIVIDUAL VIEWPOINT IMAGE | | | | | |
| zoom_S | 1 | zoom_N | 1 | | |
| REFERENCE PROJECTION PLANE PARAMETERS | | | | | |
| P_W_h | 331.2 | P_x_h | 320 | P_p_h | 1.035 |
| P_W_v | 207 | P_x_v | 400 | P_p_v | 0.5175 |
| INDIVIDUAL PROJECTION PLANE PARAMETERS | | | | | |
| P_ray | 20.125 | | | | |
| S_W_h | 1037.5875 | S_x_h | 2005 | Sp_p_h | 0.5175 |
| S_W_v | 1187.145 | S_x_v | 2294 | S_p_v | 0.5175 |
| Shift_W | 20.1825 | Shift_x | 39 | Shift_p | 0.5175 |
| Shift_all_W | 706.3875 | Shift_all_x | 1365 | Shift_all_p | 0.5175 |
| Overlap_W | 331.2 | Overlap_x | 640 | Overlap_p | 0.5175 |

FIG. 16

|  | [mm] |  | [pixel] |  | [mm/pixel] |
|---|---|---|---|---|---|
| 2D DISPLAY PARAMETERS | | | | | |
| D_W_h | 331.2 | D_x_h | 1920 | D_p_h | 0.1725 |
| D_W_v | 207 | D_x_v | 1200 | D_p_v | 0.1725 |
| 3D DISPLAY PARAMETERS | | | | | |
| 3D_W_h | 331.2 | 3D_x_h | 320 | 3D_p_h | 1.0327577 |
| 3D_W_v | 207 | 3D_x_v | 400 | 3D_p_v | 0.5175 |
| ENLARGEMENT AND REDUCTION OF INDIVIDUAL VIEWPOINT IMAGE | | | | | |
| zoom_S | 1 | zoom_N | 1.265 | | |
| REFERENCE PROJECTION PLANE PARAMETERS | | | | | |
| P_W_h | 331.619712 | P_x_h | 810 | P_p_h | 0.4094071 |
| P_W_v | 207 | P_x_v | 506 | P_p_v | 0.4094071 |
| INDIVIDUAL PROJECTION PLANE PARAMETERS | | | | | |
| P_ray | 26.4835187 | | | | |
| S_W_h | 818.814104 | S_x_h | 2000 | Sp_p_h | 0.4094071 |
| S_W_v | 1228.22116 | S_x_v | 3000 | S_p_v | 0.4094071 |
| Shift_W | 26.6114584 | Shift_x | 65 | Shift_p | 0.4094071 |
| Shift_all_W | 452.394792 | Shift_all_x | 1105 | Shift_all_p | 0.4094071 |
| Overlap_W | 366.419311 | Overlap_x | 895 | Overlap_p | 0.4094071 |
| CAMERA PARAMETERS | | | | | |
| F_W_h | 16 | F_x_h | 2000 | F_p_h | 0.008 |
| F_W_v | 24 | F_x_v | 3000 | F_p_v | 0.008 |
| F | 18 | | | | |

FIG. 17

|  | [mm] |  | [pixel] |  | [mm/pixel] |
|---|---|---|---|---|---|
| 2D DISPLAY PARAMETERS | | | | | |
| D_W_h | 331.2 | D_x_h | 1920 | D_p_h | 0.1725 |
| D_W_v | 207 | D_x_v | 1200 | D_p_v | 0.1725 |
| 3D DISPLAY PARAMETERS | | | | | |
| 3D_W_h | 331.2 | 3D_x_h | 320 | 3D_p_h | 1.035 |
| 3D_W_v | 207 | 3D_x_v | 400 | 3D_p_v | 0.5175 |
| P_W_h | 1.03795714 | P_x_h | 18.0514286 | | |
| ENLARGEMENT AND REDUCTION OF INDIVIDUAL VIEWPOINT IMAGE | | | | | |
| zoom_S | 1 | zoom_N | 1.015 | | |
| REFERENCE PROJECTION PLANE PARAMETERS | | | | | |
| P_W_h | 331.023652 | P_x_h | 650 | P_p_h | 0.5092672 |
| P_W_v | 207 | P_x_v | 406 | P_p_v | 0.5092672 |
| INDIVIDUAL PROJECTION PLANE PARAMETERS | | | | | |
| P_ray | 32.9432192 | | | | |
| S_W_h | 1527.80147 | S_x_h | 3000 | Sp_p_h | 0.5092672 |
| S_W_v | 1018.53431 | S_x_v | 2000 | S_p_v | 0.5092672 |
| Shift_W | 33.1023652 | Shift_x | 65 | Shift_p | 0.5092672 |
| Shift_all_W | 1158.58278 | Shift_all_x | 2275 | Shift_all_p | 0.5092672 |
| Overlap_W | 369.218689 | Overlap_x | 725 | Overlap_p | 0.5092672 |
| CAMERA PARAMETERS | | | | | |
| F_W_h | 24 | F_x_h | 3000 | F_p_h | 0.008 |
| F_W_v | 16 | F_x_v | 2000 | F_p_v | 0.008 |
| F | 18 | | | | |

FIG. 18

METHOD FOR PRODUCING MULTI-VIEWPOINT IMAGE FOR THREE-DIMENSIONAL IMAGE DISPLAY AND PROGRAM THEREFOR

CROSS-REFERENCE TO RELATED APPLICATION

This application is based upon and claims the benefit of priority from prior Japanese Patent Application No. 2005-117341 filed on Apr. 14, 2005 in Japan, the entire contents of which are incorporated herein by reference.

BACKGROUND OF THE INVENTION

1. Technical Field

The present invention relates to a method for producing a multi-viewpoint image for three-dimensional image display which acquires a multi-viewpoint image for three-dimensional image display.

2. Background Art

As a three-dimensional image displaying method, there is a horizontal parallax system where a flat display typified by a liquid crystal display (LCD) where pixels are arranged on a two-dimensional plane in a matrix form and an optical plate such as a lenticular sheet (a ridge line extends in a vertical direction as viewed from a viewer) for controlling a light ray direction or a slit (the same as the above) are combined and an image corresponding to a horizontal position in a viewing (observing) direction is viewed (observed) so that a three-dimensional image is recognized. The horizontal parallax system includes sub-classes of an integral imaging system, a multi-view system, and a binocular system which are the same regarding the fact that parallax is given in a horizontal direction.

Multi-viewpoint images acquired from a plurality of viewpoints different from one another in a horizontal direction are required for three-dimensional image display in the horizontal parallax systems. That is, a three-dimensional image is approximately reproduced by approximately reproducing images acquired from different viewpoints in a horizontal direction at different viewing positions (viewpoints) in the horizontal direction.

According to each system, when viewing ranges for a three-dimensional image are different and acquiring positions and the numbers of multi-viewpoint images regarding a display plane are different but a horizontal direction is defined as X direction, a vertical direction is defined as Y direction, and a viewing direction and a multi-viewpoint image acquiring direction are defined as Z direction, only X component of coordinates for a plurality of viewpoints fluctuates at equal intervals. This is due to that pixels on the flat display are arranged at equal intervals. Projection faces of images acquired from respective viewpoints are caused to coincide with a display plane of a three-dimensional image display apparatus (hereinafter, also called "3D display") and a target viewpoint is caused to coincide with the center of the display.

However, when x coordinates for respective viewpoints are made different while fixing the target viewpoint, angles defined by straight lines connecting viewpoints and the target viewpoint and a projection plane to be caused to coincide with a display plane of the original 3D display are different for respective viewpoints. When such image acquisition is realized by using a camera in an actual space or a camera model producing an image utilizing computer graphic (CG), it is necessary to use lens shifting function.

However, currently, most of cameras and camera models do not have the function. When an image is acquired utilizing a camera or a camera model which does not include a lens shifting function, an angle defined by a projection plane and a straight line which connects a viewpoint and a target viewpoint is fixed to 90°. That is, projection planes of images acquired from respective viewpoints are eventually different for the respective viewpoints. Keystone correction is required to correct deviation of a projection plane of images acquired from the respective viewpoints and an ideal projection plane to be caused to coincide with a display plane on a 3D display from each other.

As a method where the keystone correction is not conducted, there is known a method performed using a camera or a camera model which does not have a lens shifting function, where target viewpoints (individual target viewpoints) are prepared for respective viewpoints, images are acquired while maintaining angles defined by lines connecting viewpoints and individual target viewpoints and a projection plane at 90°, and respective viewpoint images are cut from overlapping regions of the projection plane shifted by deviations of individual target viewpoints (see Japanese Patent Laid Open Publication No. 2003-43413).

On the other hand, in a three-dimensional image displaying method of the horizontal parallax system, it is known that there is a display limitation in a jumping-out direction and in a depth direction (see H. Hoshino et al., J. Opt. Soc. Am. A., 15(8), 2059 (1998)). More specifically, as far as the resolution of a flat panel display is constants the resolution of the 3D display, the range where a three-dimensional image can be viewed (observed), and the jumping-out and depth limitation are put in tradeoff relationship. The jumping-out and depth limitation is limited to several centimeters to several tens centimeters in view of the resolution and the size of a current flat panel display. When a display plane of a 3D display is set to be vertical like an ordinary television set or a monitor for a personal computer, there occurs such a problem that an object to be displayed is limited in view of the range of the display limitation. For example, a distant view or an object just before a viewer, or an object having a thickness of ± several tens centimeters can not be displayed.

An object put on a flat surface tends to be limited regarding its height due to its stability, as compared with a floor area. That is, when an area of the display is limited, a height of an object displayed thereon is also limited necessarily.

As the feature of the horizontal parallax system 3D display, there is a problem that an immovable point to a display screen frame is fixed on a screen, where when a person observes in a horizontal direction, he/she thinks that infinity is an immovable point unconsciously. That is, even if an observation object appears to move leftward and rightward by swinging his/her head, he/she recognizes that the immovable point set at infinity and the object do not move and he/she himself/herself has moved.

However, in the three-dimensional display of a horizontal parallax system, recognition is made such that an immovable point is present on a display plane such as a display casing or an edge of a print object of a printing matter so that an object on this side appears to move in a direction opposed to a moving direction of an viewer while an object at a depth side appears to move in the same direction as the moving direction of the viewer. That is, a distant view appears such that it moves largely in the same direction as an observer. This causes such a problem that discrepancy from a real space is impressed.

As a similar phenomenon in the real space, it is assumed that scenery is viewed through a window. The scenery is not viewed utilizing the center of the window as a reference (an immovable point). On the other hand, when an object on a horizontal plane is viewed down, a person sets the immovable point on a plane naturally. That is, even if there is a target viewpoint (an immovable point) on a display (or a print object in a printing matter), uncomfortable feeling does not occur at all.

When a display of the horizontal parallax system is put in a flatbed manner, since there is not any parallax information in a vertical direction, it is known that natural display can be realized by acquiring respective viewpoint images to have angles to a normal line to a display plane to display a three-dimensional image (Japanese Patent Laid Open Publication No. 2003-43413). Hereinafter, such a display method is called "photographing with depression".

As described above, however, since an angle defined by a line connecting the viewpoint and the target viewpoint and a projection plane is deviated from an angle of 90° due to the depression like the case that the lens shifting function in a horizontal direction (in X direction) is required when a multi-viewpoint image is acquired, a lens shifting function in a vertical direction (in Y direction) is required. As a method for correcting this deviation, the keystone correction is adopted in the technique described in Japanese Patent Laid Open Publication No. 2004-198971.

However, it is difficult to perform keystone correction of two axes extending in the horizontal direction for acquiring a multi-viewpoint image and in the vertical direction for realizing the depression and an image with higher resolution must be acquired so as to allow enlargement and reduction for correction.

As described above, in acquisition of a multi-viewpoint image for a three-dimensional image display of a flatbed horizontal parallax system, a photographing method equivalent to the lens shifting function of two axes of a horizontal direction and a vertical direction is required, but a camera or a camera model having a lens shifting function is restrictive, and such a photographing method can not be said to be an ordinary method. The keystone correction of two axes itself is higher in difficulty than the keystone correction of one axis and the former causes distortion in an image easily.

SUMMARY OF THE INVENTION

The present invention has been made in view of these circumstances, and an object thereof is to provide a method for producing a multi-viewpoint image for a three-dimensional image display which can obtain a multi-viewpoint image which does not include distortion even if a camera or a camera model which does not have a lens shifting function is used.

According to a first aspect of the present invention, there is provided a method for producing a multi-viewpoint image for a three-dimensional image display, the method includes: providing a plurality of viewpoints to be spaced at equal intervals in direction perpendicular to a single reference projection plane including target viewpoints serving as reference are spaced at constant intervals in a first direction parallel to the reference projection plane; providing a plurality of individual target viewpoints which are respectively different from the target viewpoints serving as reference and serve as feet of a perpendicular to the plurality of viewpoints, corresponding to the respective viewpoint, on a projection plane which is a plane including the reference projection plane; while the shapes and the areas of the individual projection planes which are regions in the projection planes of images acquired from the plurality of viewpoints are kept constant, making determination such that the shapes and the sizes of the individual projection planes are included in the reference projection plane in overlapping regions of the individual projection planes acquired from two viewpoints positioned at the outermost positions of the plurality of viewpoints; and clipping only regions of the reference projection plane from the individual projection planes acquired from the respective viewpoints to form a multi-viewpoint image for three-dimensional image display.

The resolutions of the respective viewpoint images can be defined such that the resolution of the reference projection plane substantially coincides with the resolution of a three-dimensional image display apparatus.

Ranges of the respective individual projection planes can be set such that the range of the reference projection plane substantially coincides with the display area of a three-dimensional image display apparatus.

The depression which is an angle formed by projection components of lines connecting the target viewpoint and the respective viewpoints to a plane perpendicular to the first direction and the projection plane can be set to an angle of 50° to 60°.

The depression can be 55°.

Regarding both the width parallel to the first direction and the width parallel to the reference projection plane and parallel to a second direction perpendicular to the first direction, images can be acquired in a range of the individual projection plane having an occupation range exceeding an occupation range of the reference projection plane and images corresponding to only the ranges of the reference projection plane can be clipped to be reserved as respective viewpoint images.

A model can be not disposed on the range of the individual projection plane except for the range occupied by the reference projection plane as far as possible, or even if a model is disposed on the range of the individual projection plane except for the range occupied by the reference projection plane, the model can not be rendered.

A longitudinal direction of a film in a photographing device can be caused to coincide with a second direction perpendicular to the first direction of the reference projection plane.

By providing the projection plane above the actual floor, a displayable range in a depth direction of the three-dimensional image display apparatus can be utilized.

According to a second aspect of the present invention, there is provided with a computer-executable program for producing a multi-viewpoint image for three-dimensional image display which acquires a multi-viewpoint image used for three-dimensional image display for providing parallax in a horizontal direction to cause a viewer to recognize three-dimensional image, the program including instructions for: providing a plurality of viewpoints to be spaced at equal intervals in direction perpendicular to a single reference projection plane including target viewpoints serving as reference are spaced at constant intervals in a first direction parallel to the reference projection plane; providing a plurality of individual target viewpoints which are respectively different from the target viewpoints serving as reference and serve as feet of a perpendicular to the plurality of viewpoints, corresponding to the respective viewpoint, on a projection plane which is a plane including the reference projection plane; while the shapes and the areas of the individual projection planes which are regions in the projection planes of images acquired from the plurality of viewpoints are kept constant, making determination such that the shapes and the sizes of the individual projection planes are included in the reference projection plane in overlapping regions of the individual projection planes acquired from two viewpoints positioned at the outermost positions of the plurality of viewpoints; and clipping only regions of the reference projection plane from the individual projection planes acquired from the respective viewpoints to form a multi-viewpoint image for three-dimensional image display.

BRIEF DESCRIPTION OF THE DRAWINGS

FIGS. 1A to 1C are conceptual diagrams for explaining a method for producing a multi-viewpoint image for a three-dimensional image display according to an embodiment of the present invention;

FIG. 4 is a table showing parameters used in a first embodiment;

FIG. 5 is a table showing a parameter used in the first embodiment;

FIG. 6 is a table showing relational equations of parameters used in the first embodiment;

FIG. 8 is a table for explaining the depression dependency of a horizontal plane and a vertical plane to a ratio (b/a);

FIG. 10 is a table showing parameters used in a second embodiment;

FIG. 11 is a table showing a relational equations of parameters used in the second embodiment;

FIG. 16 is a table showing numerical values of respective parameters in Example 1;

FIG. 17 is a table showing numerical values of respective parameters in Example 2; and FIG. 18 is a table showing numerical values of respective parameters in Comparative Example 2.

DETAILED DESCRIPTION OF THE INVENTION

Figure 2B:
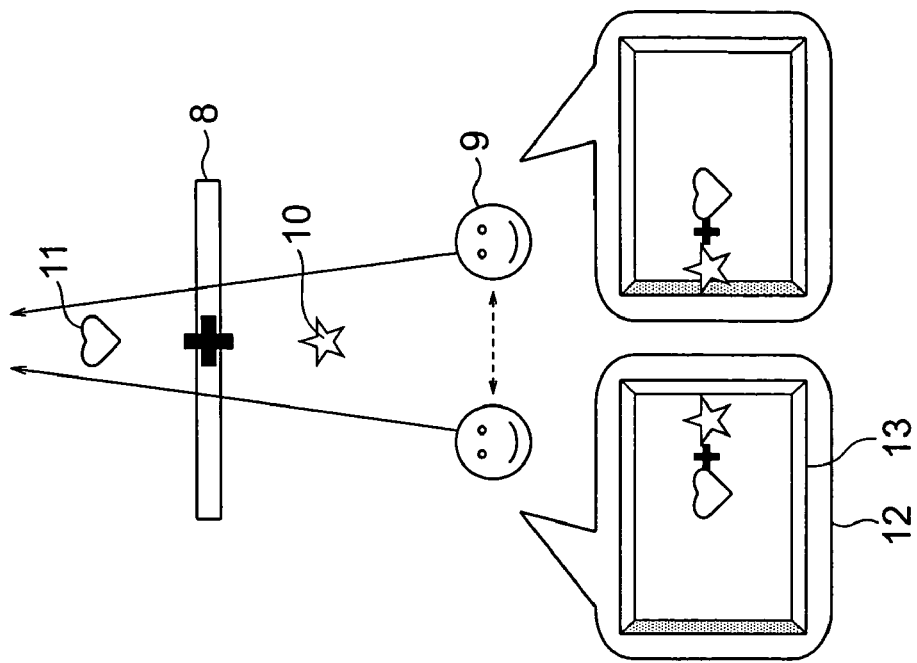
FIGS. 2A and 2B are diagram for explaining an image of parallax information obtained by a viewer.

Embodiments of the present invention will be explained below in detail with reference to the drawings.

First Embodiment

A method for producing a multi-viewpoint image for a three-dimensional image display according to a first embodiment of the present invention will be explained. The multi-viewpoint image producing method according to the embodiment is a method for producing a multi-viewpoint image for a three-dimensional image display used in 3D display of a horizontal parallax system and it is for acquiring a multi-viewpoint image in a 3D-CG model space. The feature of the multi-viewpoint image producing method according to the embodiment lies in that only a camera model is present but various parameters such as a film size, a resolution, and a focal length are not limited. As described later, therefore, any wide angle photographing can be performed so as to conform with an individual projection plane required.

Conceptual diagrams of the multi-viewpoint image producing method according to the embodiment are shown in FIGS. 1A, 1B, and 1C. FIG. 1A is a perspective view for explaining a concept of the multi-viewpoint image producing method according to the embodiment, FIG. 1B is a front view as viewed from a direction orthogonal to an image acquiring direction in FIG. 1A, and FIG. 1C is a side view as viewed from the image acquiring direction. In FIGS. 1A to 1C, reference numeral 1 denotes a viewpoint, 2 denotes a reference projection plane, 3 denotes an individual projection plane, 4 denotes a target viewpoint, 5 denotes an individual target viewpoint, 6 denotes a film face of a camera (or a camera model), 7 denotes a distance between the outermost viewpoints, g denotes a distance between a 2D display and an exit pupil of an optical plate, and L1 denotes a multi-viewpoint image acquisition distance.

Figure 2A:
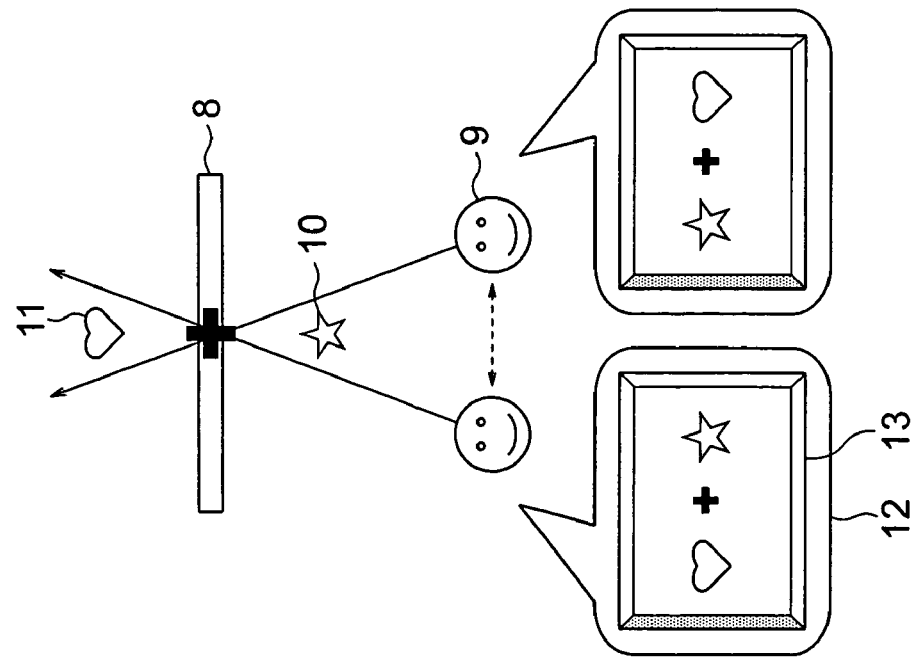

Now, images of parallax information from a viewer are shown in FIGS. 2A and 2B. In FIGS. 2A and 2B, reference numeral 8 denotes a 3D display, 9 denotes a viewer, 10 denotes a three-dimensional image displayed in front of the 3D display, 11 denotes a three-dimensional image displayed behind the 3D display, 12 denotes an image viewed by the viewer 9, and 13 denotes a screen frame of the 3D display. The 3D display 8 of a horizontal parallax system includes such a problem that an immovable point to the display screen frame 13 is fixed on a screen (see FIG. 2A). When a person observes in a horizontal direction, he/she thinks that infinity is the immovable point unconsciously. That is, even if an observation object appears to move leftward and rightward by swinging his/her head, he/she recognizes that the immovable point set at infinity and the object do not move and he/she himself/herself has moved (see FIG. 2B).

Next, parameters will be explained. Here, the number of parallaxes and a parallax angle (an angle where a three-dimensional image can be viewed) of the horizontal parallax system, an observation viewing distance, the number of multi-viewpoint images required, a viewing point coordinate for a (ideal) multi-viewpoint image, and the like which are determined depending on the 2D display or the optical plate are omitted, and explanation is made assuming that values of the following parameters have been obtained or determined in advance.

The number of parallaxes [parallax]: Np

Multi-viewpoint image acquisition distance [mm]: L1

Distance between 2D display and exit pupil of optical plate [mm]: g

The number of multi-viewpoint images [pieces]: N_need

Depression [degrees]: φ

Figure 3:
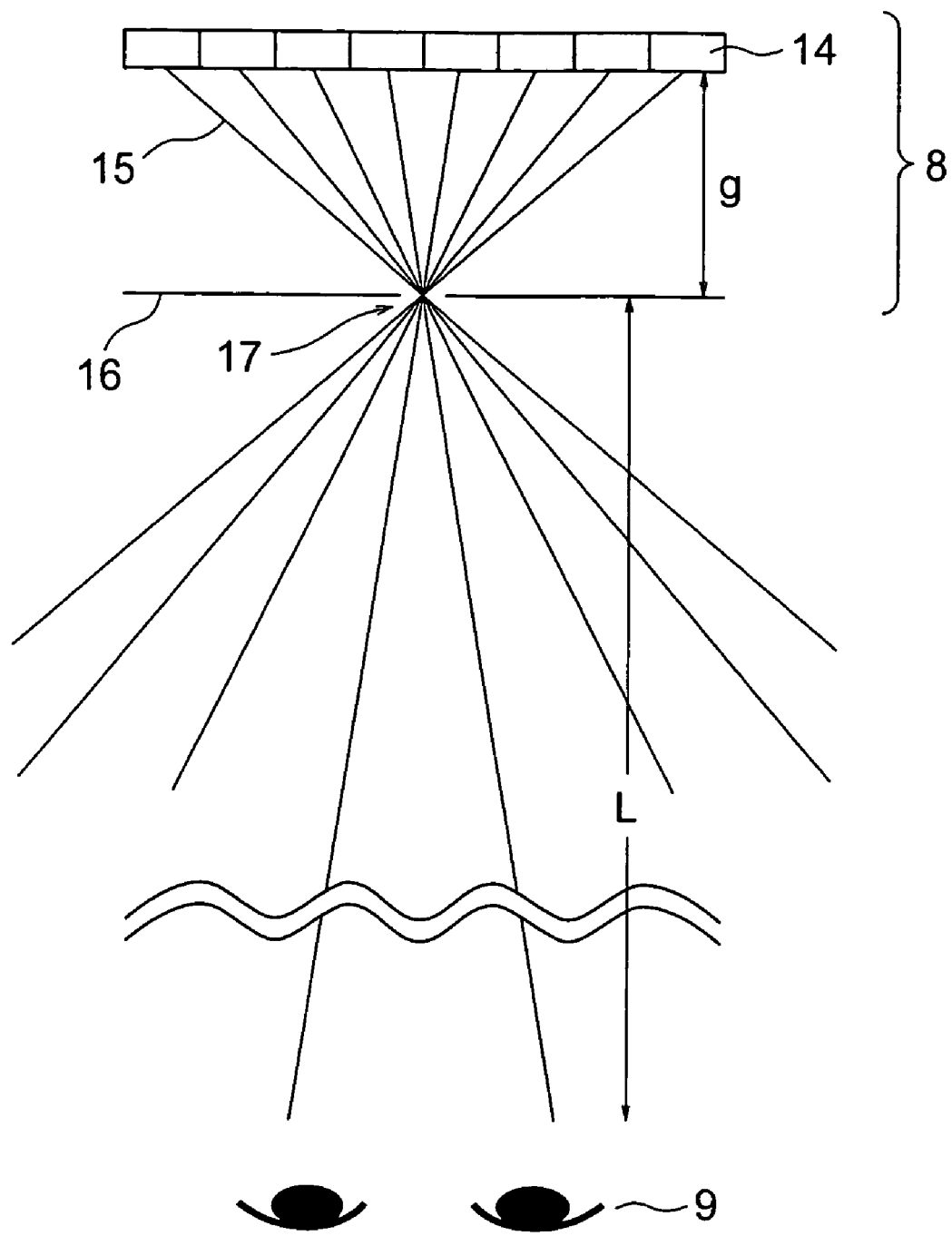
FIG. 3 is a diagram showing a relationship between a pixel pitch of a 2D display and intervals of light rays carrying parallax information due to a gap between the 2D display and an exit pupil of an optical plate.

The parameter g is an air conversion gap between a 2D display and an exit pupil of an optical plate, specifically, it means an air conversion gap between a surface of the pixel 14 of the 2D display and the exit pupil 17 of the optical plate 16. The parameter serves as a parameter for determining a distance where a multi-viewpoint image with parallax information can be viewed in a 3D display 8 of a horizontal parallax system (see FIG. 3). In FIG. 3, reference numeral 9 denotes a viewer (observer), 15 denotes a main light ray of light rays which is emitted from a pixel and whose direction is restricted via an exit pupil, and L denotes a viewing distance.

Next, parameters of a reference projection plane and an individual projection plane regarding the multi-viewpoint image used in a 3D display of a horizontal parallax system are shown in FIGS. 4 and 5. A plane including a projection plane equivalent to a surface of the 3D display is represented as xy plane and a viewing direction or a multi-viewpoint image acquisition direction is defined as z direction.

In a three-dimensional image display of a horizontal parallax system, since one pixel on the 3D display is constituted using a plurality of pixels arranged horizontally on a 2D display, a horizontal resolution in the 3D display becomes lower than that in the 2D display.

As shown in FIGS. 1A to 1C, the reference projection plane 2 means a projection plane of a multi-viewpoint image used for three-dimensional image display of a horizontal parallax system, where when an image acquisition corresponding to same magnification photographing (where zooming is not used), an occupation area and a resolution correspond to respective parameters of the 3D display. The individual projection plane 3 indicates an image which is acquired at a wide angle such that, even if positions of images obtained from respective viewpoints (x coordinate) are fluctuated in production of a multi-viewpoint image where an image is acquired while a line connecting the viewpoint 1 and the target viewpoint 4 in the first embodiment and a normal line to a projection plane are kept parallel, the reference projection plane 2 is contained in images obtained from all the viewpoints. Regions of the reference projection plane are clipped from the individual projection planes so that a multi-viewpoint image for three-dimensional image display of a horizontal parallax system can be produced.

In order to avoid confusion, a target viewpoint on the reference projection plane 2 (a target viewpoint used when a lens shifting function is provided) is simply called "a target viewpoint 4", while a target viewpoint provided for each viewpoint for the producing method according to the embodiment is called "an individual target viewpoint 5". Parameters are given to a shift of the individual target viewpoint 5 in the horizontal coordinate, a shift in the horizontal coordinate between the outermost projection planes, and a horizontal width of an overlapping region of the individual projection planes 3, respectively (see FIG. 4).

In addition, a light ray interval (P_ray) in the multi-viewpoint image acquisition distance L1 included in the parameters of the individual projection plane 3 will be further explained. As shown in FIG. 3, since an emitting direction of a light ray 15 from which parallax information can be viewed is determined based upon a pixel pitch of the 2D display and an air conversion gap g of the optical plate 16 used in the 3D display 8 of a horizontal parallax system, an acquisition position of a multi-viewpoint image at the multi-viewpoint image acquisition distance L1 is determined according to the above determination. Thereby, the light ray interval P_ray at L1 is included in the parameters of the individual projection plane 3.

Parameters Zoom_S and Zoom_N regarding enlargement and reduction of a multi-viewpoint image are provided in addition with the parameters shown in FIG. 4 (see FIG. 5). These parameters relate to a size and a resolution of content displayed on the 3D display of a horizontal parallax system. When the size of the reference projection plane is set to the same as the 3D display, a size of a model displayed on the 3D display become the same as the size in a model space. When the sizes of the reference projection plane in the horizontal direction and the vertical directions are made twice, the size of a model displayed on the 3D display becomes ½ of the size in the model space. When the resolution on the reference projection plane of the multi-viewpoint image acquired is lower than that of the 3D display, a displaying performance of the 3D display can not be utilized sufficiently.

Relational equations relating these parameters to one another are shown in FIG. 6.

Np[parallax], L1[mm], g[mm], N_need [viewpoint], φ[degree], D_x_h[pixel], D_p_h[pixel], D_x_v[mm/pixel], and D_p_v[mm/pixel] are given with defaults.

The horizontal resolution of the 3D display of a horizontal parallax system can be obtained by dividing the horizontal resolution of the 2D display by the number of parallaxes (Np). In the 2D displays including a liquid crystal display, one pixel is constituted by allocating R(red),G(green),B(blue) to three sub-pixels arranged in a horizontal direction, but since parallax images are arranged at sub-pixel pitch, the horizontal resolution of the 3D display (3D_x_h[pixel]) is given by 3D_x_h=D_x_h×3/Np.

On the other hand, the vertical resolution (3D_x_v) can be set independently of the three-dimensional image display and it can be set arbitrarily according to balance between the horizontal resolution and the vertical resolution of the 3D display or according to resolution base.

Next, the size and the resolution of the reference projection plane 2 are simply required to correspond to the 3D display, and they reflect values of the parameters ZoomS and ZoomN regarding enlargement and reduction of a multi-viewpoint image according to circumstances. The parameter regarding the individual projection plane 3 reflects the distance (P_ray) between light rays carrying parallax information at the distance (L1) for acquiring an image. That is, the viewpoints of the individual projection images are set to coincide with the distance between light rays.

Next, though all the pixel pitches of the parameters of the individual projection planes 3 are set to be equal to P_p_v, since 3D_p_h and 3D_p_v in the 3D display are set independently of each other and P_p_h and P_p_v are also set independently, as described above, it is desirable that the pixel pitch of the individual projection plane 3 satisfies smaller one of P_p_h and P_p_v.

Since the resolution of the 3D display becomes lower than that of the 2D display inevitably, 3D_x_v independent of the number of parallaxes in the 3D display may be set to be larger than 3D_x_h in order to maintain quality of a display image. That is, since 3D_p_v is often set to be equal to or smaller than 3D_p_h, all the pixel pitches of the parameters regarding the individual projection plane 3 are set to P_p_v, assuming that the 3D_p_v is small in this case.

Next, the shift Shift_x[pixel] for each viewpoint of x coordinate of the individual projection plane is given by Shift_x=ROUND(P_ray_/P_p_v) so as to be equal to the light ray distance (P_ray) at the viewing distance L. Here, ROUND (w) is an operator for rounding a value of the first decimal point of "w" to make an integral number. Since the shift of the individual projection plane 3 corresponds to a shift of a clipping position for the reference projection plane 2 as it is, integral multiplication of a sampling pitch (Shift_p[mm/pixel]) of the individual projection image is obtained by the rounding, so that a clipped multi-viewpoint image can be prevented from degrading (re-sampling is not required).

Next, a distance between the outermost two viewpoints (Shift_all_x[pixel]) is obtained from the number of viewpoints (N_need[viewpoint]) required utilizing Shift_all_x=Shift_x*(N_need-1). This is a shift of the individual projection plane 3 from the two viewpoints which are separated from each other maximally, the horizontal number of pixels (S_x_h) and the horizontal width (S_W_h[mm]) on the individual projection plane can be obtained by absorbing the shift and adding the overlapping region (Overlap_x [pixel]) corresponding to the reference projection plane 2 (see FIGS. 1B and 6). These parameters can be obtained from the following equations.

Overlap_x=P_x_h*P_p_h/P_p_v

S_x_h=Shift_all_x+Overlap_x

S_W_v=S_p_13_v*S_x_v

On the other hand, the vertical resolution (S_x_v[pixel]) is obtained by the depression (ϕ[degree]). That is, by adopting S_x_v=ROUND(2*(L1/TAN(ϕ)+P_W_v/2)/P_p_v), a vertical component (yz plane) of an angle defined by the line connecting the center of the reference projection plane 2 and the viewpoint and the reference projection plane 2 can be set to ϕ. Here, rounding is performed such that a position for clipping the reference projection plane 2 from the individual projection plane 3 is set to integral multiplication of the sampling pitch (S_p_v[mm/pixel]) of the individual projection plane 3 in order to prevent re-sampling of each viewpoint image after clipped.

Here, the horizontal pixel pitch (3D_p_h) of the 3D display is given by 3D_p_h=3D_W_h/3D_x_h, but this equation is a calculation equation utilized in an integral imaging system where relationship of parallel rays is realized by setting the horizontal pixel pitch of the 3D display to integral multiplication of the horizontal pixel pitch of the 2D display. In a system where a converging (focal) point is provided at a viewing distance like the multi-viewpoint system, the equation is given by 3D_p_h=3D_W_h/3D_x_h*L/(L+g).

Figure 7:
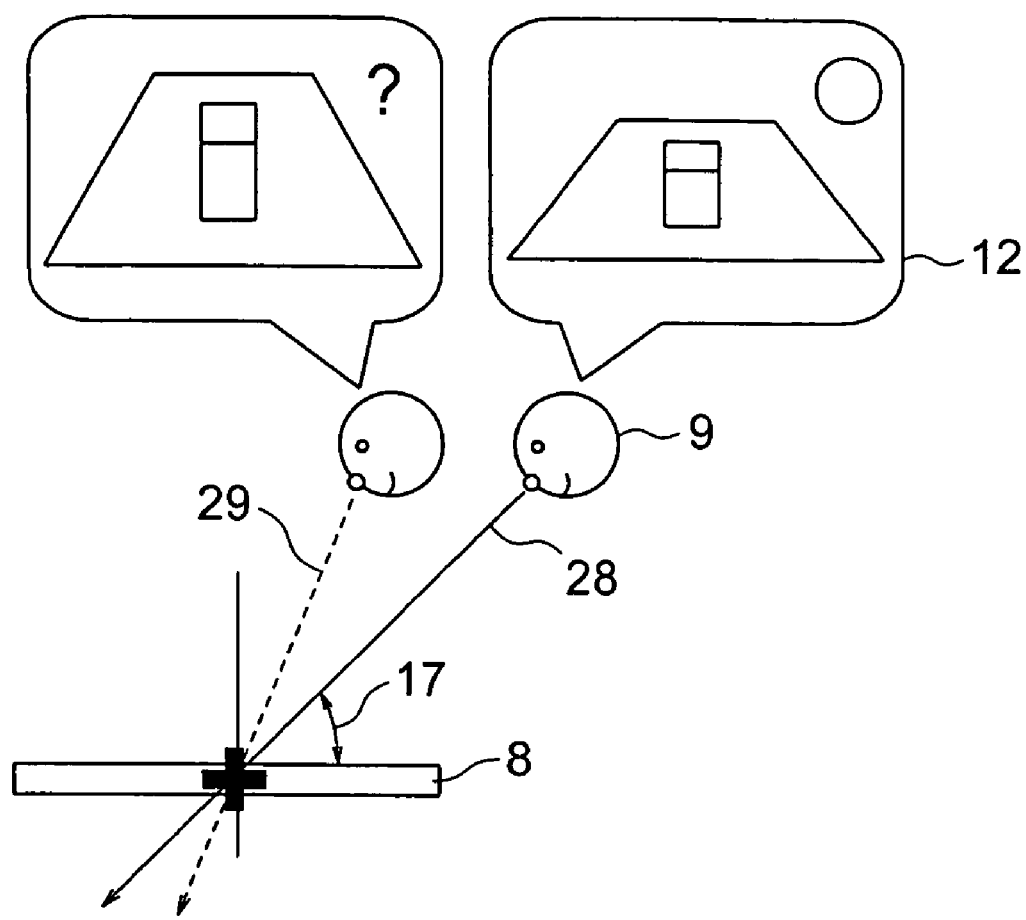
FIG. 7 is a conceptual diagram of a depression dependency of appearing in a flatbed 3D display of a horizontal parallax system.

It is preferable that the depression is in an angle range of 50° to 60° at the center of 55°. The reason will be described below. The problem in the flatbed three-dimensional display applied with the horizontal parallax system lies in that since there is not parallax information in the vertical direction (y direction), when a viewer moves in the y direction, an object distorted (see FIG. 7). In FIG. 7, reference numeral 8 denotes a 3D display, 9 denotes a viewer, 12 denotes an image viewed by the viewer 9, 27 denotes a depression, 28 denotes a viewing direction of a set depression, and 29 denotes a viewing direction of a depression larger than the set depression. Even if a desirable depression is present, it is difficult to fix the viewer 9 at the position. On the contrary, there is a tendency that the viewer 9 desires to view a displayed object from a front thereof more strongly according to increase of interest in the content of the displayed object (the depression becomes larger). That is, some robustness is required to fluctuation of a viewing position in the y direction.

Further, as the result of the inventors' studying, such a fact has been found that uncomfortable feeling to fluctuation of the viewing position is reduced according to increase of the depression, but when the depression is excessively large, a side face of an object is hardly viewed and such an impression as a flatbed placing display lowers. In view of the subjective assessment, depressions of 45°, 50°, 55°, 60°, and 65° are compared with one another. As a result, it has been determined that the depression of 55° is most preferable, and 50° and 60° are preferable in this order. The fact can be understood from the following relational equation.

Assuming a plate parallel to the zx plane arranged on the flatbed type 3D display, a height parallel to the z axis is represented as "a" (widths parallel to x and y axes are not considered in this case). When a height at a viewing time with a depression is represented as "a" and a component of "a" on the xy plane is represented as "b", a ratio of "a" to "b" is expressed by the following equation.

b/a=1/TAN(ϕ)

Figure 8:
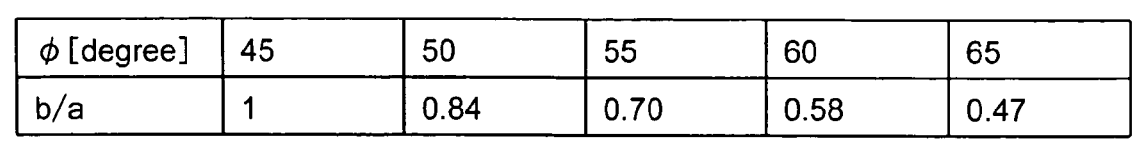

That is, the result shown in FIG. 8 is obtained.

In case of ϕ=45°, b/a=1 is satisfied, that is, projection to the xy plane is performed while the height is maintained. For example, assuming a cube, width and height in the x direction and the y direction appear to be the same. Since the same indicates a relationship easily detected by a person, when a viewer moves his/her head in the y direction to increase a depression, uncomfortable feeling increases if the relationship of a=b is maintained. On the other hand, in case of ϕ=65°, b/a becomes lower than ½ (b/a<1). For example, assuming a rectangular solid having a height of twice width in the x and y directions, the width in the x and y directions and the height appear to be the same. The height of twice indicates a relationship easily conceived by a person, but uncomfortable feeling is large when the height is the same as the width of x and y even when the depression is reduced. Therefore, in the range of 50° to 60° where the height decreases from the original height but b/a is not below ½, the height "a" slightly decreases due to projection to the xy plane, so that change due to fluctuation of the depression is hardly recognizable. Especially, b/a=0.7 at ϕ=55° is positioned at an intermediate angle of the angle range, which is considered to be robust to fluctuation of the depression.

Figure 9:
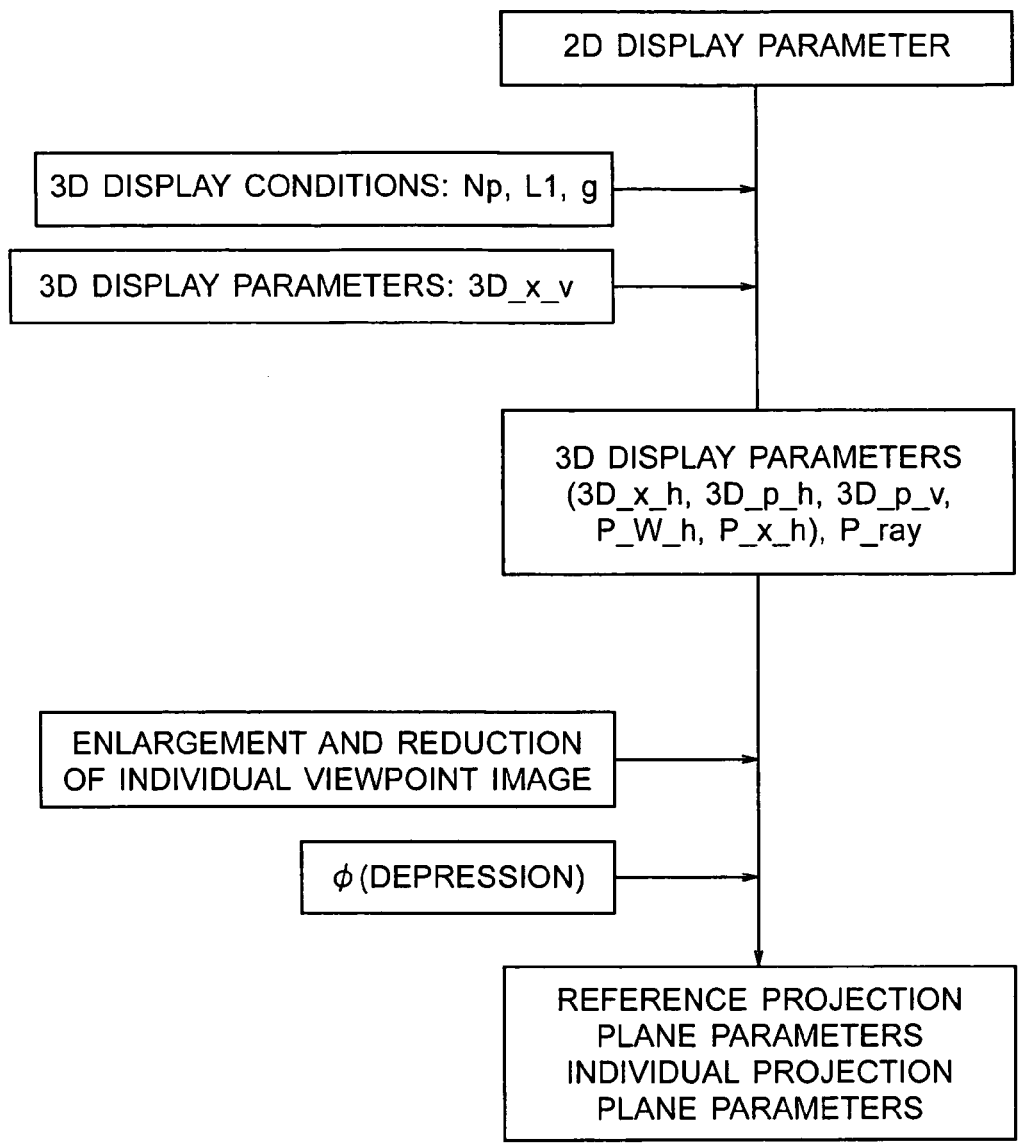
FIG. 9 is a flowchart showing a course of multi-viewpoint image production in a CG space according to the first embodiment.

A procedure of the method for producing a multi-viewpoint image for a 3D display of a flatbed type in a model space is shown with a flowchart in FIG. 9. In addition to various parameters for a 2D display to be used, the number of parallaxes (Np), a viewing distance (L1), and an air conversion gap (g) between a pixel portion and an optical plate in the 2D display which are design values for the 3D display of a horizontal parallax system are determined. By determining a vertical resolution of the 3D display independently of these parameters, other parameters of the 3D display are determined. By determining quality (resolution and size) of a multi-viewpoint image used for display on the 3D display and a depression, a reference projection plane parameter and an individual projection plane parameter are determined. A multi-viewpoint image is formed based upon the reference projection plane parameter and the individual projection plane parameter as follows:

First of all, a plurality of viewpoints provided to be spaced at equal intervals in direction perpendicular to a single reference projection plane including target viewpoints serving as reference are spaced at constant intervals in a first direction parallel to the reference projection plane, a plurality of individual target viewpoints which are respectively different from the target viewpoints serving as reference and serve as feet of a perpendicular to the plurality of viewpoints are provided, corresponding to the respective viewpoint, on a projection plane which is a plane including the reference projection plane, the shapes and the areas of the individual projection planes which are regions in the projection planes of images acquired from the plurality of viewpoints are kept constant, the shapes and the sizes of the individual projection planes are determined to be included in the reference projection plane in overlapping regions of the individual projection planes acquired from two viewpoints positioned at the outermost positions of the plurality of viewpoints, only regions of the reference projection plane are clipped from the individual projection planes acquired from the respective viewpoints, so that a multi-viewpoint image for three-dimensional image display is formed.

Incidentally, the resolutions of the respective viewpoint images can be defined such that the resolution of the reference projection plane substantially coincides with the resolution of the three-dimensional image display apparatus.

Further, ranges of the respective individual projection planes can be set such that the range of the reference projection plane substantially coincides with the display area of the three-dimensional image display apparatus.

Furthermore, the depression which is an angle formed by projection components of lines connecting the target viewpoint serving as the reference and the respective viewpoints to a plane perpendicular to the first direction and the projection plane may be set to an angle of 50° to 60°.

The depression may be 55°.

Regarding both the width parallel to the first direction and the width parallel to the reference projection plane and parallel to a second direction perpendicular to the first direction, such a constitution may be adopted that images are acquired in a range of the individual projection plane having an occupation range exceeding an occupation range of the reference projection plane and images corresponding to only the ranges of the reference projection plane are clipped to be reserved as respective viewpoint images. In this case, a memory region occupied by a multi-viewpoint image can be reduced.

Incidentally, such a constitution may be adopted that a model is not disposed on the range of the individual projection plane except for the range occupied by the reference projection plane as far as possible, or even if a model is disposed on the range of the individual projection plane except for the range occupied by the reference projection plane, the model is not rendered. In that case, a rendering time for acquiring an image in the individual projection range can be reduced.

As explained above, according to the embodiment, even if a camera or a camera model which does not have a lens shifting function is used, a multi-viewpoint image which does not include distortion can be obtained.

Second Embodiment

Next, a method for producing a multi-viewpoint image for three-dimensional image display according to a second embodiment of the present invention will be explained. The multi-viewpoint image producing method according to the embodiment is a method for producing a multi-viewpoint image for three-dimensional image display for a 3D display of a horizontal parallax system, and is for performing image acquisition in an actual space, namely, image acquisition using a camera. A significant difference between a camera model in a CG space and an actual camera lies in that various parameters such as a film size, a resolution, and a focal length are limited. Thereby, camera parameters shown in FIG. 10 are added in addition to the respective parameters described in the first embodiment.

The parameters shown in FIG. 10 are added and relational equations about portions different from the case of the CG model space (see FIG. 6) are shown in FIG. 11. These equations will be explained. Features in an actual photographing are described collectively.

Figure 12:
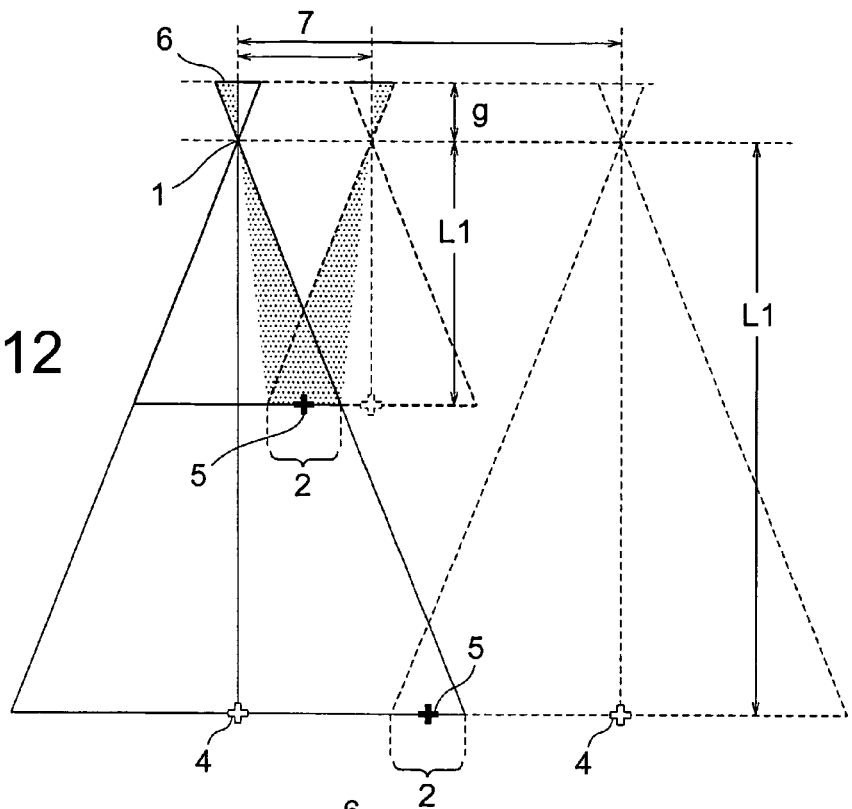
FIG. 12 is a diagram for explaining a photographing distance dependency of a ratio of an individual projection plane and a reference plane.

(1) In order to secure an overlapping region of the individual projection planes 3 acquired from viewpoints at both ends so as to correspond to a width of a 3D display in a state that the number of viewpoints (N_need) is fixed, it is necessary to narrow a horizontal width of the reference projection plane 2 on the individual projection planes 3 relatively. That is, it is necessary to distance a viewpoint 1 to some extent (make L1 large) to enlarge the individual projection planes 3 relatively (shown with a broken line in FIG. 12).

Figure 13:
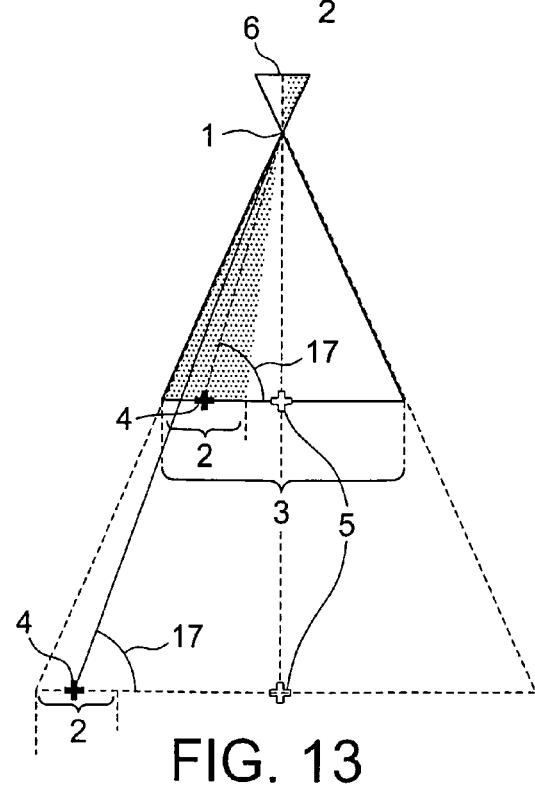
FIG. 13 is a diagram for explaining a photographing distance dependency of a depression.

(2) In order to increase the depression (4) in a state that the focal length (f) of a camera is fixed, it is necessary to narrow clipping ranges of the reference projection plane 2 on the individual projection planes 3 relatively. That is, it is necessary to distance the viewpoint 1 to some extent (make L1 large) to enlarge the individual projection planes 3 relatively (shown with a broken line in FIG. 13).

(3) When a distance (L1) between the viewpoint and the projection plane is large, an image sampling interval (P_p_h and P_p_v) on the projection plane becomes coarse.

That is, it is necessary to satisfy all the requirements (1) to (3). Relational equations for obtaining the photographing conditions will be explained below.

First, since the focal length (f[mm]) of the camera, the size (F_W_h, F_W_v) or the resolution (F_x_h, F_x_v) of the CCD (or the film) have been determined, when the photographing distance (L1) is determined, the resolution (P_p_h, P_p_v) of an image on the reference projection plane (=the individual projection plane) is determined.

$$P\_p\_h = F\_p\_h * L1/f$$

$$P\_p\_v = F\_p\_v * L1/f$$

By determining the height (P_W_v) of the reference projection plane, namely, $$P\_W\_v = 3D\_W\_v * Zoom\_S,$$

the resolution (P_x_h, P_x_v) on the reference projection plane is determined as follows:

$$P\_x\_v = ROUND(P\_W\_v / P\_p\_v)$$

$$P\_x\_h = ROUND(P\_x\_v * 3D\_W\_h / 3D\_W\_v)$$

Rounding is performed in order to prevent re-sampling from occurring at a clipping time of the reference projection plane, as also explained above.

On the other hand, as described in the item (1), a realizable depression ($\phi$[degree]) is related with the height (P_W_v [mm]) of the reference projection plane and the photographing distance (L1[mm]). That is, $$L1/(F\_W\_v * L1/f - P\_W\_v)/2 = TAN(\phi)$$

Accordingly, by setting L1 so as to satisfy L1=(TAN($\phi$)*P_W_v)/2/(TAN($\phi$)*F_W_v/f/2−1), $\phi$ can be realized. At that time, however, there is a problem about whether or not the overlapping region (Overlap_W[mm]) of the individual projection planes acquired from the viewpoints at both the ends described in the item (2) satisfies the screen width and whether or not the resolution (P_p_v[mm/pixel]) of the projection plane satisfies the resolution (smaller one of 3D_p_h [mm/pixel] and 3D_p_v[mm/pixel]) of the 3D display. It is necessary to set $\phi$ on the large side depending on the values.

Here, though the horizontal pixel pitch (3D_p_h) of the 3D display is given by

3D_p_h=3D_W_h/3D_x_h, and this equation is a calculation equation utilized in an integral imaging system where relationship of parallel rays is realized by setting the horizontal pixel pitch of the 3D display to integral multiplication of the horizontal pixel pitch of the 2D display. In a system where a converging (focal) point is provided at a viewing distance like the multi-viewpoint system, the equation is given by 3D_p_h=3D_W_h/3D_x_h*L/(L+g).

Figure 14:
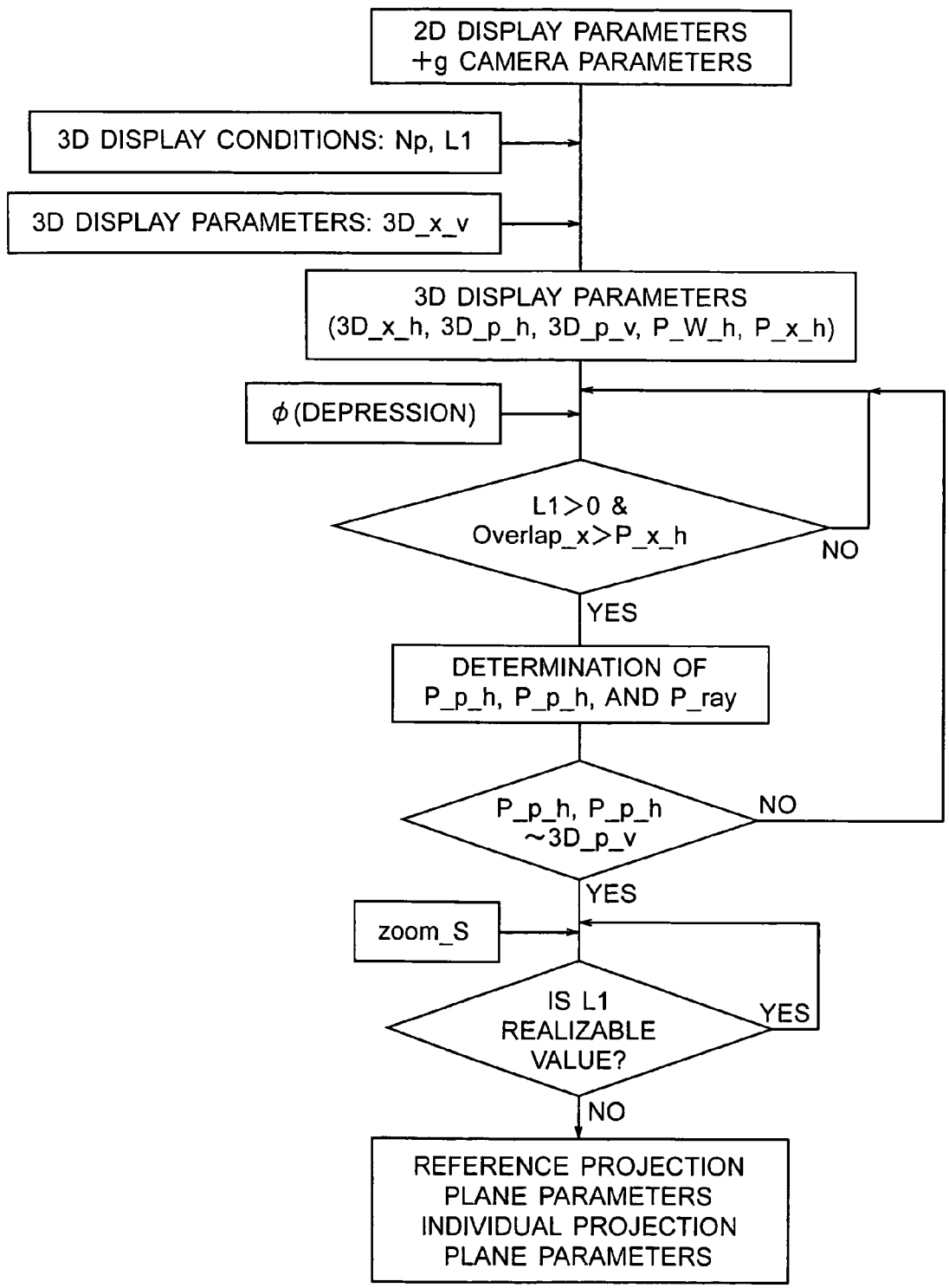
FIG. 14 is a flowchart showing a course of a multi-viewpoint image production in an actual photographing according to the second embodiment.

A procedure of the method for producing a multi-viewpoint image for a 3D display of a flatbed type in the actual photographing as explained above is shown with a flowchart in FIG. 14. In addition to various parameters of the 2D display to be used, the number of parallaxes (Np), a viewing distance (L1), and an air conversion gap (g) between a pixel portion and an optical plate in the 2D display which are design values for the 3D display of a horizontal parallax system are determined. By determining a vertical resolution of the 3D display independently of these parameters, other parameters of the 3D display are determined. When the depression (φ) is assumed, determination is made about whether or not the photographing distance (L1) for realizing this is present and the horizontal width of the overlapping region of the individual projection planes acquired from two viewpoints positioned at the outermost ends satisfies the width of the reference projection plane. Unless these two items are satisfied, the depression is reduced to satisfy these two items. When the two items are satisfied, the parameter (P_p_h, P_p_v) of the reference projection plane and the light ray distance (P_ray) at the photographing distance are determined. When these parameters do not realize a resolution satisfying the display performance of the 3D display, L1 is reduced (φ is increased necessarily). That is, L1 is increased (=reduction of φ) in a range where the horizontal width satisfies the reference width and lowering below the display resolution of the 3D display does not occur. Finally, when it is difficult to perform photographing due to that L1 is large excessively, the individual projection plane can be photographed so as to have a display plane (ZoomS is set to be 1 or less). The respective parameters of the reference projection plane and the individual projection plane are determined via the above process (the photographing conditions are determined). A multi-viewpoint image is formed based upon the reference projection plane parameters and the individual projection plane parameters in the following manner.

First of all, a plurality of viewpoints are provided to be spaced at equal intervals in direction perpendicular to a single reference projection plane including target viewpoints serving as reference are spaced at constant intervals in a first direction parallel to the reference projection plane, a plurality of individual target viewpoints which are respectively different from the target viewpoints serving as reference and serve as feet of a perpendicular to the plurality of viewpoints are provided, corresponding to the respective viewpoint, on a projection plane which is a plane including the reference projection plane, the shapes and the areas of the individual projection planes which are regions in the projection planes of images acquired from the plurality of viewpoints are kept constant, the shapes and the sizes of the individual projection planes are determined to be included in the reference projection plane in overlapping regions of the individual projection planes acquired from two viewpoints positioned at the outermost positions of the plurality of viewpoints, only regions of the reference projection plane are clipped from the individual projection planes acquired from the respective viewpoints, so that a multi-viewpoint image for three-dimensional image display is formed.

Incidentally, the resolutions of the respective viewpoint images can be defined such that the resolution of the reference projection plane substantially coincides with the resolution of the three-dimensional image display apparatus.

Further, ranges of the respective individual projection planes can be set such that the range of the reference projection plane substantially coincides with the display area of the three-dimensional image display apparatus.

Furthermore, the depression which is an angle formed by projection components of lines connecting the target viewpoint serving as the reference and the respective viewpoints to a plane perpendicular to the first direction and the projection plane may be set to an angle of 50° to 60°.

The depression may be 55°.

Incidentally, a longitudinal direction of a film in the photographing device may be caused to coincide with a second direction perpendicular to the first direction of the reference projection plane. In that case, a low depression can be realized.

Further, by providing the projection plane above the actual floor, a displayable range in a depth direction of the three-dimensional image display apparatus can be utilized.

Figure 15A:
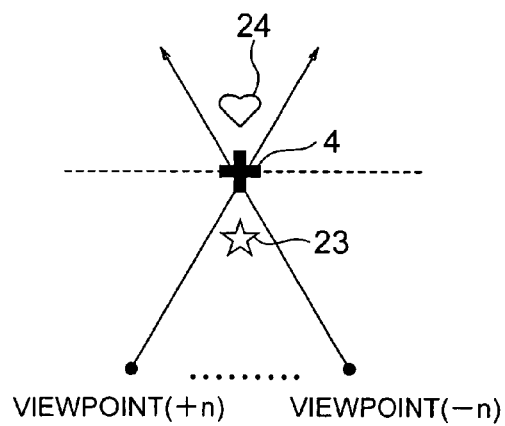
FIGS. 15A to 15C are conceptual diagrams of display position operation based upon a clipped position of a multi-viewpoint image acquired.
Figure 15B:
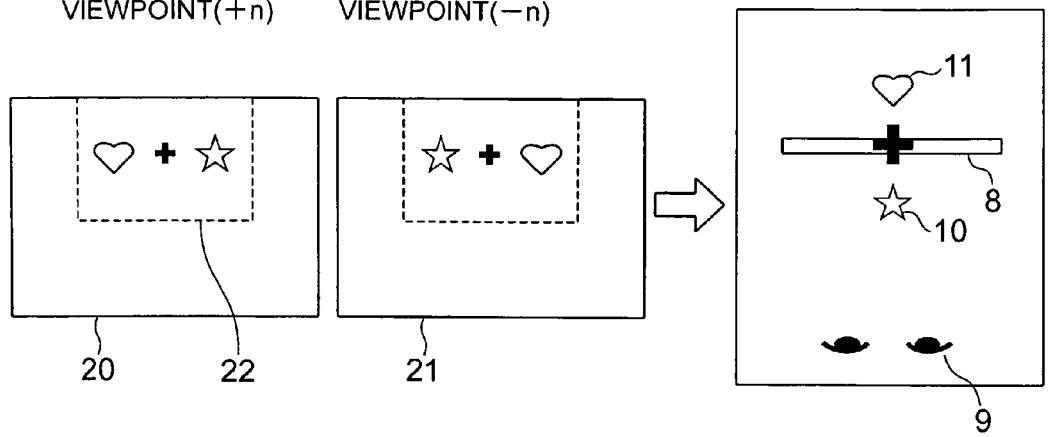
Figure 15C:
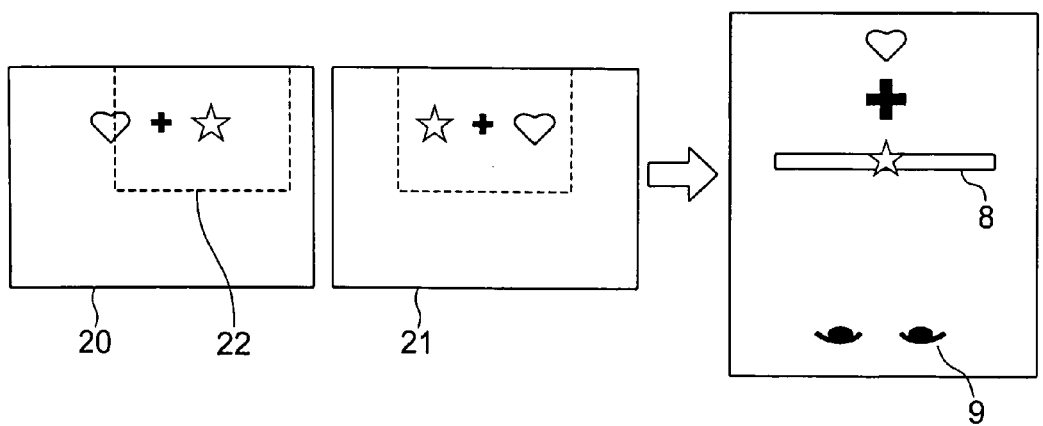

Finally, wide-angle photographing (shot) achieve such a merit that depth of subject or depth of field can be made deeper. In the three-dimensional image display of a horizontal parallax system, the display position can be changed to a position ahead of or behind the display position by adjusting a clipping position from the multi-viewpoint image. More specifically, since the reference projection plane in the three-dimensional space coincides with the display, a point fixed on the display is determined according to how to select (how to clip) the reference projection plane by acquiring the individual projection plane at wide angle. In detail, as shown in FIG. 15A, the display position as the three-dimensional image can be moved by acquiring the reference projection plane at an angle wider than a range 22 where the reference projection plane is utilized as the multi-viewpoint image and shifting the horizontal position of the range where the reference projection plane is utilized as the multi-viewpoint image. In FIGS. 15A, 15B, and 15C, reference numeral 20 denotes a reference projection plane acquired from the viewpoint (+n), 21 denotes a reference projection plane acquired from the viewpoint (−n), 22 denotes a utilization range as the reference projection plane, 23 denotes an object or a model present ahead of a projection plane including a target viewpoint, and 24 denotes an object or a model present behind a projection plane including a target viewpoint.

In FIG. 15B, a target viewpoint appears to be displayed on a screen of the 3D display, because the target viewpoint on the reference projection plane is clipped based on the reference. On the other hand, as shown in FIG. 15C, when clipping is performed based upon a model positioned ahead of the target viewpoint and the clipped object is utilized as the multi-viewpoint image, a model 22 positioned ahead of the target viewpoint appears to be displayed on a screen of the 3D display, while a model 23 positioned behind the target viewpoint appears to be displayed further behind the target viewpoint. In order to conduct such operations, it is necessary to perform photographing with deep depth of field in advance. That is, movement of the display position due to such change of the clipping position is made possible according to focusing in the range of models 22 to 23 in FIG. 15A, but movement to the display plane can not be conducted depending on the degree of blurring generated according to separation from the target viewpoint. In that meaning, a wide-angle photographing is useful in actual photographing where the depth of field is limited.

Incidentally, a program for performing the method for producing a multi-viewpoint image for three-dimensional image display according to the first and second embodiments is implemented by a hardware constitution utilizing an ordinary computer provided with a control device such as a CPU (central processing unit), a memory device such as a ROM (read only memory) or a RAM (random access memory), an external storage such as a HDD, a CD (compact disc) drive device, a display device such as a display unit, and an input device such as a keyboard or a mouse.

The program for producing a multi-viewpoint image for three-dimensional image display according to the first and second embodiments is recorded in a computer-readable recording medium such as a CD-ROM (compact disc read only memory), a flexible disc (FD), a CD-R (compact disk recordable), or a DVD (digital versatile disk) in a file of an installable form or an executable form to be provided.

Such a constitution may be adopted that the program for producing a multi-viewpoint image for three-dimensional image display according to the first and second embodiments is stored in a computer connected to a network such as Internet and it is provided by downloading via the network. Such a constitution may be adopted that the program for producing a multi-viewpoint image for three-dimensional image display according to the first and second embodiments is provided or distributed via a network such as Internet.

Such a constitution may be adopted that the program for producing a multi-viewpoint image for three-dimensional image display according to the first and second embodiments is provided via a ROM storing the same or the like in advance.

Regarding the clipping of the reference projection plane from the individual projection plane, such a represent has been adopted in the above description that the reference projection plane is clipped from the image of the individual projection plane. However, since only the range of the reference projection plane is utilized, considerable improvement of efficiency can be realized especially in rendering of a CG model by performing rendering work on only a range corresponding to the reference projection plane.

Further, in order to realize a depression of a lower angle, it is apparent that the length of the film area in a direction parallel to the y axis is larger. Therefore, in a camera using a horizontally long film or light receiving element array, photographing is effectively conducted as a vertical long film or light receiving element array by rotating the camera at an angle of 90°. This will be explained in the following Examples in detail.

EXAMPLE 1

When, for example, a QUXGA display with a resolution (D_x_h, D_x_v) of 1920[pixel]×1200[pixel], a display region size (D_W_h×D_W_v) of 331.2[mm]×207.0[mm] is used as the 2D display, the pixel pitch (D_p_h, D_p_v) is 0.1725[mm]. The number of parallaxes (Np) was set to 18, and a lenticular sheet with a vertical ridge line having a lens component only in a horizontal direction was used as the optical plate. Since an integral imaging system (a system where an orthographic projection image was used as the multi-viewpoint image by designing the horizontal lens pitch to integral multiplication of the pixel pitch on the 2D display accurately) was adopted, the number of viewpoints (N_Need) required increased in order for securing the viewing area in maximum as compared with the number of parallaxes (Np). The horizontal lens pitch (3D_p_h) was 1.035[mm/pixel]. Parameters when respective viewpoint images are produced from a 3D-CG model are shown in FIG. 16.

Here,
Np=18[parallax]
L1=700[mm]
g=2[mm]
N_Need=36[parallax], and
$\phi$=55[degree]
were adopted.

That is, the size (S_W_h, S_W_v) of the individual projection plane was formed in a slightly vertically longer size such as 1037.5875[mm]×1187.145[mm], the sampling pitch of an image on a projection plane was 0.5175[mm] which was completely coincident with the vertical pixel pitch (3D_p_v) of the 3D display, and the resolution (S_x_h, S_x_v) of the individual projection plane was 2005[pixel]×2294[pixel]. The interval between viewpoints (Shift_W) was 20.1825[mm] in the horizontal direction, and a multi-viewpoint image of a horizontal parallax system was produced by conducting clipping while shifting the clipping position of each viewpoint image by 39[pixel] for each viewpoint.

A three-dimensional image whose elementary image array was produced from a multi-viewpoint image acquired using this approach and which was displayed on a 3D display of a flatbed type integral imaging system was natural and had a high presence. Since the depression was set at an angle of 55°, a three-dimensional image whose uncomfortable feeling was suppressed to movement of a viewer in the y direction was obtained.

EXAMPLE 2

In a 3D display of a horizontal parallax system like Example 1, the number of viewpoints (N_Need) required was made equal to that in the multi-viewpoint system by adopting an integral imaging system and using an approach called "pseudo multi-viewpoint" (an elementary image array was produced so as to approximate to the multi-viewpoint system). Parameters when respective viewpoint images are produced using actual photographing) are shown in FIG. 17. A camera utilized had a focal length f=18 mm. Here,
Np=18[parallax]
L1=921.1658667[mm]
g=2[mm]
N_Need=18[parallax], and
$\phi$=61[degree]
were adopted.

The camera was used by rotating the same by an angle of 90° such that a longitudinal direction (24 mm, the number of pixels: 3000) of a pickup element was parallel to the y axis of the display. Individual projection images were acquired while the camera on a rail spaced from the projection plane by 920 mm was being moved in a horizontal direction for each 26.6 mm, and clipping was conducted while shifting was being performed for each 65[pixel], so that a multi-viewpoint image was produced. The depth of field was deep due to the wide-angle photographing and a display position of a three-dimensional image could be wholly moved to a front side by changing the clipping position of the reference projection plane (the multi-viewpoint image) in a range of 64 to 30 [pixel].

Here, the integral imaging system was explained, but design values in the multi-viewpoint system were also approximately similar to those therein.

A multi-viewpoint image produced based upon the above conditions secured a resolution similar to that of a 3D display. Further, since an image could be acquired with a depression of 61°, a three-dimensional image display with high presence of a photographed image could be realized.

COMPARATIVE EXAMPLE 1

It was tried to realize $\phi$=57° in constitution of Example 2. However, L1 was 5996.8[mm] and the image sampling pitch (P_p_h, P_p_v) on a projection plane was 2.7[mm], so that photographing itself was unrealistic and even if an image was acquired, a resolution thereof is considerably lower than the resolution of the 3D display, so that a three-dimensional image with sufficient quality can not be displayed.

COMPARATIVE EXAMPLE 2

It was tried to acquire an image in constitution similar to Example 2 while a longitudinal direction of a film face of a camera remained to be coincident with the x direction. However, a realizable depression was 70° which was largely deviated from a desirable range. Parameters at that time are shown in FIG. 18. Here,
Np=18[parallax]
L1=1145.8511[mm]
g=2[mm]
N_Need=36[viewpoint], and
φ=70.5[degree]
were adopted.

When a three-dimensional image display was performed using a multi-viewpoint image acquired, display where a side face hardly appeared (a large depression) was obtained so that presence remarkably lowered.

As explained above, according to the respective embodiments of the present invention, even if a camera or a camera model which does not have a lens shifting function is used, a multi-viewpoint image which does not include distortion can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

The invention claimed is:

1. A computer-implemented method for producing a multi-viewpoint image for three-dimensional image display which acquires a multi-viewpoint image used for three-dimensional image display for providing parallax in a horizontal direction to cause a viewer to recognize a three-dimensional image, comprising the steps performed by a processing unit of a computer of:
setting, by the processing unit, a plurality of viewpoints to be spaced at equal intervals in direction perpendicular to a single reference projection plane including target viewpoints serving as references that are spaced at constant intervals in a first direction parallel to the reference projection plane;
setting, by the processing unit, a plurality of individual target viewpoints which are respectively different from the target viewpoints serving as the references and serve as feet of a perpendicular to the plurality of viewpoints, corresponding to the respective viewpoint, on a projection plane which is a plane including the reference projection plane;
while the shapes and the areas of the individual projection planes which are regions in the projection planes of images acquired from the plurality of viewpoints are kept constant, making a determination, by the processing unit, such that the shapes and the sizes of the individual projection planes are included in the reference projection plane in overlapping regions of the individual projection planes acquired from two viewpoints positioned at the outermost positions of the plurality of viewpoints; and
cutting out, by the processing unit, regions of the reference projection plane from the individual projection planes acquired from the respective viewpoints to form a multi-viewpoint image for three-dimensional image display, wherein the cut-out regions are shifted in position in horizontal and vertical directions for the respective viewpoints.

2. The method according to claim 1, wherein the resolutions of the respective viewpoint images can be defined such that the resolution of the reference projection plane substantially coincides with the resolution of a three-dimensional image display apparatus.

3. The method according to claim 1, wherein ranges of the respective individual projection planes are set such that the range of the reference projection plane substantially coincides with the display area of a three-dimensional image display apparatus.

4. The method according to claim 1, wherein the depression which is an angle formed by projection components of lines connecting the target viewpoint and the respective viewpoints to a plane perpendicular to the first direction and the projection plane is set to an angle of 50° to 60°.

5. The method according to claim 4, wherein the depression is 55°.

6. The method according to claim 1, wherein, regarding both the width parallel to the first direction and the width parallel to the reference projection plane and parallel to a second direction perpendicular to the first direction, images are acquired in a range of the individual projection plane having an occupation range exceeding an occupation range of the reference projection plane and images corresponding to only the ranges of the reference projection plane are cut out to be reserved as respective viewpoint images.

7. The method according to claim 6, wherein a model is not disposed on the range of the individual projection plane except for the range occupied by the reference projection plane as far as possible, or even if a model is disposed on the range of the individual projection plane except for the range occupied by the reference projection plane, the model is not rendered.

8. The method according to claim 1, wherein a longitudinal direction of a film in a photographing device is caused to coincide with a second direction perpendicular to the first direction of the reference projection plane.

9. The method according to claim 1, wherein, by providing the projection plane above the actual floor, a displayable range in a depth direction of the three-dimensional image display apparatus is utilized.

10. The method according to claim 2, wherein ranges of the respective individual projection planes are set such that the range of the reference projection plane substantially coincides with the display area of a three-dimensional image display apparatus.

11. The method according to claim 2, wherein the depression which is an angle formed by projection components of lines connecting the target viewpoint and the respective viewpoints to a plane perpendicular to the first direction and the projection plane is set to an angle of 50° to 60°.

12. The method according to claim 11, wherein the depression is 55°.

13. The method according to claim 2, wherein, regarding both the width parallel to the first direction and the width parallel to the reference projection plane and parallel to a second direction perpendicular to the first direction, images are acquired in a range of the individual projection plane having an occupation range exceeding an occupation range of the reference projection plane and images corresponding to only the ranges of the reference projection plane are cut out to be reserved as respective viewpoint images.

14. The method according to claim 13, wherein a model is not disposed on the range of the individual projection plane except for the range occupied by the reference projection plane as far as possible, or even if a model is disposed on the range of the individual projection plane except for the range occupied by the reference projection plane, the model is not rendered.

15. The method according to claim 2, wherein a longitudinal direction of a film in a photographing device is caused to coincide with a second direction perpendicular to the first direction of the reference projection plane.

16. The method according to claim 2, wherein, by providing the projection plane above the actual floor, a displayable range in a depth direction of the three-dimensional image display apparatus is utilized.

17. A computer-readable medium containing instructions which, when executed by a processor, cause a computer to perform a method for producing a multi-viewpoint image for three-dimensional image display which acquires a multi-viewpoint image used for three-dimensional image display for providing parallax in a horizontal direction to cause a viewer to recognize a three-dimensional image, the method comprising:

setting a plurality of viewpoints to be spaced at equal intervals in direction perpendicular to a single reference projection plane including target viewpoints serving as references that are spaced at constant intervals in a first direction parallel to the reference projection plane;

setting a plurality of individual target viewpoints which are respectively different from the target viewpoints serving as the references and serve as feet of a perpendicular to the plurality of viewpoints, corresponding to the respective viewpoint, on a projection plane which is a plane including the reference projection plane;

while the shapes and the areas of the individual projection planes which are regions in the projection planes of images acquired from the plurality of viewpoints are kept constant, making a determination such that the shapes and the sizes of the individual projection planes are included in the reference projection plane in overlapping regions of the individual projection planes acquired from two viewpoints positioned at the outermost positions of the plurality of viewpoints; and cutting out regions of the reference projection plane from the individual projection planes acquired from the respective viewpoints to form a multi-viewpoint image for three-dimensional image display, wherein the cut-out regions are shifted in position in horizontal and vertical directions according to the respective viewpoints.

* * * * *